United States Patent
Nakajo

(10) Patent No.: US 7,486,604 B2
(45) Date of Patent: Feb. 3, 2009

(54) OPTICAL DISK DEVICE AND PROGRAM FOR RECORDING AND REPRODUCING INFORMATION ON AND FROM AN OPTICAL RECORDING MEDIUM

(75) Inventor: Yukihisa Nakajo, Yokohama (JP)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 673 days.

(21) Appl. No.: 11/132,728

(22) Filed: May 18, 2005

(65) Prior Publication Data

US 2005/0270941 A1 Dec. 8, 2005

(30) Foreign Application Priority Data

May 20, 2004 (JP) ............................. 2004-150501

(51) Int. Cl.
   *G11B 20/10* (2006.01)
(52) U.S. Cl. .................................................. 369/59.12
(58) Field of Classification Search ........................ None
   See application file for complete search history.

(56) References Cited

U.S. PATENT DOCUMENTS

| | | | |
|---|---|---|---|
| 6,188,656 B1 * | 2/2001 | Shoji et al. ............... | 369/47.25 |
| 7,224,660 B2 * | 5/2007 | Nakajo .................... | 369/59.11 |
| 2001/0006500 A1 * | 7/2001 | Nakajima et al. ........ | 369/47.35 |
| 2004/0017752 A1 * | 1/2004 | Furumiya et al. ........ | 369/47.53 |

FOREIGN PATENT DOCUMENTS

| | | |
|---|---|---|
| JP | 2000-030254 | 1/2000 |
| JP | 2003-030837 | 1/2003 |
| KR | 1020010056435 | 4/2001 |

OTHER PUBLICATIONS

Patent Abstracts of Japan for JP2003-030837 published Jan. 31, 2003.
Patent Abstracts of Japan for JP2000-030254 published Jan. 28, 2000.

* cited by examiner

*Primary Examiner*—Joseph H Feild
*Assistant Examiner*—Christopher R Lamb
(74) *Attorney, Agent, or Firm*—Volentine & Whitt, PLLC

(57) ABSTRACT

The present invention relates to an optical disk device for recording or reproducing information on or from an optical information recording medium by forming marks and spaces. The device includes a jitter value measurement unit, a measurement unit, measured value memory, theoretical length memory, a deviation value calculation unit, a flexibility amount calculation unit, a correction value calculation unit, and a jitter value calculation unit. The measurement unit measures the lengths of marks and spaces using a varied reference write strategy. The deviation value calculation unit calculates the deviation values of the marks and the spaces. The flexibility amount calculation unit calculates the amounts of intrinsic flexibility of all marks and spaces. The correction value calculation unit calculates a correction value for the reference write strategy. The jitter value calculation unit calculates a jitter value.

11 Claims, 14 Drawing Sheets

|  | 3TS | 4TS | 5TS | 6TS |
|---|---|---|---|---|
| 3TM | −6.7 | 0.2 | 17.2 | 24.8 |
| 4TM | −24.2 | −7.1 | 11.7 | 18.6 |
| 5TM | −28.2 | −10.6 | 7.4 | 11.8 |
| 6TM | −23.2 | −1.9 | 12.9 | 18.5 |

(b)

|  | 3TS | 4TS | 5TS | 6TS |
|---|---|---|---|---|
| 3TM | −11.4 | −25.6 | −4.8 | 41.3 |
| 4TM | −28.1 | −32.1 | −11.6 | 35.0 |
| 5TM | −29.7 | −34.7 | −11.8 | 27.6 |
| 6TM | −7.2 | 11.9 | 27.5 | 33.7 |

(c)

|  | 3TS | 4TS | 5TS | 6TS |
|---|---|---|---|---|
| 3TM | −2.4 | −12.9 | −11.0 | 8.3 |
| 4TM | −2.0 | −12.5 | −11.6 | 8.2 |
| 5TM | −0.7 | −12.0 | −9.6 | 7.9 |
| 6TM | 8.0 | 6.9 | 7.3 | 7.6 |

(a)

(b)

|     | 3T | 4T | 5T | 6T | 7T | 8T | 9T | 10T | 11T |
|-----|----|----|----|----|----|----|----|-----|-----|
| 3T  | 1  | 3  | 7  | 13 | 21 | 31 | 43 | 57  | 73  |
| 4T  | 2  | 4  | 8  | 14 | 22 | 32 | 44 | 58  | 74  |
| 5T  | 5  | 6  | 9  | 15 | 23 | 33 | 45 | 59  | 75  |
| 6T  | 10 | 11 | 12 | 16 | 24 | 34 | 46 | 60  | 76  |
| 7T  | 17 | 18 | 19 | 20 | 25 | 35 | 47 | 61  | 77  |
| 8T  | 26 | 27 | 28 | 29 | 30 | 36 | 48 | 62  | 78  |
| 9T  | 37 | 38 | 39 | 40 | 41 | 42 | 49 | 63  | 79  |
| 10T | 50 | 51 | 52 | 53 | 54 | 55 | 56 | 64  | 80  |
| 11T | 65 | 66 | 67 | 68 | 69 | 70 | 71 | 72  | 81  |

|      | 3TM  | 4TM  | 5TM  | 6TM   | 7TM   | 8TM   | 9TM   | 10TM  | 11TM  |
|------|------|------|------|-------|-------|-------|-------|-------|-------|
| 3TS  | 28.7 | 11.0 | -2.4 | -23.8 | -30.1 | -32.4 | -34.7 | -34.9 | -23.0 |
| 4TS  | 33.0 | 17.9 | 8.9  | -33.4 | -34.5 | -37.9 | -41.6 | -37.6 | -33.5 |
| 5TS  | 47.0 | 30.5 | 23.8 | -20.3 | -23.9 | -27.4 | -24.5 | -22.0 | -22.7 |
| 6TS  | 4.8  | -3.2 | -11.0| -15.5 | -18.4 | -19.0 | -19.9 | -18.7 | -24.3 |
| 7TS  | 7.8  | 0.1  | -12.4| -19.7 | -15.7 | -24.4 | -21.2 | -20.7 | -6.9  |
| 8TS  | 12.3 | 1.4  | -8.8 | -10.7 | -17.3 | -17.7 | -12.9 | -22.1 | -5.8  |
| 9TS  | 8.9  | 1.3  | -6.5 | -11.2 | -10.7 | -9.7  | -23.1 | -33.3 | -11.7 |
| 10TS | 13.2 | 5.6  | -3.9 | -11.9 | -8.0  | -14.7 | -20.1 | -20.0 | -2.0  |
| 11TS | 15.0 | 9.2  | -9.4 | -4.5  | -3.2  | -4.7  | 19.2  | -19.3 | -16.5 |

(b)

|      | 3TM  | 4TM  | 5TM  | 6TM  | 7TM  | 8TM  | 9TM  | 10TM | 11TM |
|------|------|------|------|------|------|------|------|------|------|
| 3TS  | 24.3 | 10.4 | -2.7 | -8.4 | -10.4| -13.9| -13.3| -16.2| -3.6 |
| 4TS  | 8.8  | -5.5 | -15.0| -19.3| -21.2| -24.2| -25.7| -26.8| -24.0|
| 5TS  | 21.5 | 7.5  | -0.6 | -7.3 | -8.4 | -12.6| -10.0| -8.0 | -7.5 |
| 6TS  | 23.0 | 12.0 | 3.8  | -1.3 | -4.7 | -6.8 | -4.2 | -9.7 | 1.9  |
| 7TS  | 23.5 | 13.7 | 2.9  | -5.1 | -4.2 | -7.8 | -11.2| -10.7| -2.5 |
| 8TS  | 28.9 | 15.8 | 6.0  | 2.8  | -0.7 | -7.1 | -5.8 | -9.2 | 8.5  |
| 9TS  | 27.5 | 16.8 | 8.2  | 3.2  | 2.7  | -1.8 | -7.5 | -8.9 | 6.1  |
| 10TS | 28.2 | 20.2 | 9.2  | 2.7  | 2.8  | 2.9  | -11.2| -4.7 | 2.4  |
| 11TS | 39.2 | 17.9 | 9.7  | 16.8 | 13.2 | 4.9  | 12.0 | 24.4 | -7.2 |

(c)

|      | 3TM  | 4TM  | 5TM  | 6TM  | 7TM  | 8TM  | 9TM  | 10TM | 11TM |
|------|------|------|------|------|------|------|------|------|------|
| 3TS  | 2.2  | 0.3  | 0.2  | -7.7 | -9.8 | -9.2 | -10.7| -9.3 | -9.7 |
| 4TS  | 12.1 | 11.7 | 12.0 | -7.0 | -6.7 | -6.9 | -7.9 | -5.4 | -4.8 |
| 5TS  | 12.8 | 11.5 | 12.2 | -6.5 | -7.7 | -7.4 | -7.2 | -7.0 | -7.6 |
| 6TS  | -9.1 | -7.4 | -7.4 | -7.1 | -6.9 | -6.1 | -7.8 | -4.5 | -13.1|
| 7TS  | -7.9 | -6.8 | -7.6 | -7.3 | -5.8 | -8.3 | -5.0 | -5.0 | -2.2 |
| 8TS  | -8.3 | -7.2 | -7.4 | -6.7 | -8.3 | -5.3 | -3.6 | -6.5 | -7.2 |
| 9TS  | -9.3 | -7.8 | -7.4 | -7.2 | -6.7 | -4.0 | -7.8 | -12.2| -8.9 |
| 10TS | -7.5 | -7.3 | -6.6 | -7.3 | -5.4 | -8.8 | -4.5 | -7.6 | -2.2 |
| 11TS | -12.1| -4.4 | -9.5 | -10.6| -8.2 | -4.8 | 3.6  | -21.9| -4.7 |

(a)

|  | 3TM | 4TM | 5TM |
|---|---|---|---|
| 3TS | 2.2 | 0.3 | 0.2 |
| 4TS | 12.1 | 11.7 | 12.0 |
| 5TS | 12.8 | 11.5 | 12.2 |

(b)

|  | 3TM | 4TM | 5TM |
|---|---|---|---|
| 3TS | 8.52773 | 7.12039 | 7.16309 |
| 4TS | 19.0212 | 18.793 | 19.1154 |
| 5TS | 20.0785 | 18.8578 | 19.5277 |

Distribution after combination
Number of samples: $n = n_1 + n_2$
AVG: $R = (n_1 * R_1 + n_2 * R_2)/(n_1 + n_2)$
Standard deviation: $\sigma$ Number of samples: $n_1$
AVG: $R_1$
Standard deviation: $\sigma_1$ Number of samples: $n_2$
AVG: $R_2$
Standard deviation: $\sigma_2$

|      | 3TM  | 4TM  | 5TM  | 6TM  | 7TM  | 8TM  | 9TM  | 10TM | 11TM |
|------|------|------|------|------|------|------|------|------|------|
| 3TS  | 24.3 | 23.9 | 23.9 | 23.8 | 23.2 | 22.4 | 24.0 | 23.6 | 21.8 |
| 4TS  | 22.8 | 21.4 | 21.2 | 21.1 | 21.8 | 22.7 | 22.0 | 20.8 | 22.4 |
| 5TS  | 22.5 | 21.4 | 21.4 | 21.6 | 22.2 | 21.2 | 22.7 | 24.4 | 20.6 |
| 6TS  | 22.1 | 20.9 | 20.2 | 22.1 | 20.5 | 20.5 | 22.4 | 20.5 | 17.4 |
| 7TS  | 21.3 | 19.3 | 20.7 | 20.3 | 20.3 | 20.0 | 20.5 | 18.4 | 16.8 |
| 8TS  | 22.6 | 20.5 | 20.2 | 21.4 | 20.9 | 18.1 | 18.7 | 21.5 | 19.3 |
| 9TS  | 22.6 | 21.5 | 22.2 | 18.5 | 19.4 | 20.7 | 20.9 | 19.1 | 21.3 |
| 10TS | 20.6 | 21.6 | 19.1 | 21.5 | 21.8 | 20.5 | 21.7 | 19.6 | 18.7 |
| 11TS | 21.1 | 18.8 | 18.2 | 18.2 | 20.3 | 20.3 | 6.9  | 0.0  | 20.8 |

(b)

|      | 3TM    | 4TM    | 5TM    | 6TM    | 7TM    | 8TM   | 9TM   | 10TM  | 11TM  |
|------|--------|--------|--------|--------|--------|-------|-------|-------|-------|
| 3TS  | 7079.0 | 4880.0 | 3350.0 | 1980.0 | 1319.0 | 971.0 | 624.0 | 302.0 | 162.0 |
| 4TS  | 4444.0 | 3053.0 | 2228.0 | 1565.0 | 1056.0 | 816.0 | 442.0 | 313.0 | 248.0 |
| 5TS  | 3204.0 | 2279.0 | 1706.0 | 925.0  | 869.0  | 518.0 | 412.0 | 205.0 | 203.0 |
| 6TS  | 2284.0 | 1274.0 | 1074.0 | 551.0  | 533.0  | 354.0 | 194.0 | 91.0  | 69.0  |
| 7TS  | 1347.0 | 967.0  | 787.0  | 577.0  | 409.0  | 192.0 | 160.0 | 114.0 | 30.0  |
| 8TS  | 1164.0 | 718.0  | 517.0  | 304.0  | 237.0  | 142.0 | 157.0 | 55.0  | 33.0  |
| 9TS  | 709.0  | 473.0  | 294.0  | 202.0  | 160.0  | 144.0 | 75.0  | 34.0  | 9.0   |
| 10TS | 312.0  | 223.0  | 187.0  | 139.0  | 136.0  | 57.0  | 53.0  | 22.0  | 13.0  |
| 11TS | 362.0  | 52.0   | 31.0   | 262.0  | 18.0   | 20.0  | 2.0   | 0.0   | 508.0 |

(c)

|      | 3TM  | 4TM  | 5TM  | 6TM  | 7TM  | 8TM  | 9TM  | 10TM  | 11TM  |
|------|------|------|------|------|------|------|------|-------|-------|
| 3TS  | 5.3  | -2.3 | 5.3  | 0.6  | -1.8 | -3.5 | -4.0 | 5.4   | -0.8  |
| 4TS  | -4.5 | -5.2 | 3.0  | -0.1 | -0.9 | -3.7 | -6.3 | 7.0   | -3.0  |
| 5TS  | -0.6 | 2.6  | -5.7 | -9.3 | 9.7  | 8.2  | 9.4  | 4.4   | 8.3   |
| 6TS  | -5.7 | -1.9 | 9.4  | 5.8  | 4.8  | 3.5  | 1.6  | -1.9  | 7.8   |
| 7TS  | 5.3  | -7.3 | 3.6  | -1.7 | -0.2 | 0.5  | -5.4 | -5.4  | -4.2  |
| 8TS  | 7.0  | -8.5 | 6.1  | 0.5  | -2.5 | -1.2 | 0.3  | -11.1 | -0.1  |
| 9TS  | 3.2  | -8.2 | 4.8  | 1.1  | 0.5  | -1.4 | -4.8 | -2.9  | -12.0 |
| 10TS | 2.3  | -9.1 | 1.5  | -0.2 | -0.3 | -8.8 | -5.1 | -12.0 | 1.9   |
| 11TS | 4.6  | 4.5  | -9.9 | -5.5 | -7.0 | 12.6 | 17.9 | 6.7   | 5.3   |

OPTICAL DISK DEVICE AND PROGRAM FOR RECORDING AND REPRODUCING INFORMATION ON AND FROM AN OPTICAL RECORDING MEDIUM

INCORPORATION BY REFERENCE

The present application claims priority under 35 U.S.C. §119 to Japan Patent Application No. 2004-150501 filed on May 20, 2004. The content of the application is incorporated herein by reference in its entirety.

BACKGROUND OF THE INVENTION

1. Field of the Invention

The present invention relates generally to an optical disk device and program for recording and reproducing information on and from an optical recording medium such as a compact disk and a digital video disk.

2. Description of the Related Art

As the Internet has remarkably become popularized due to the advance of information and communication technology, much information is actively being exchanged over a network. Under this environment, in the field of information recording device technology, a write-once read-many optical disk, such as a Compact Disk-Recordable (CD-R), or a rewritable optical disk, such as a Compact Disk-Rewritable (CD-RW), is recently attracting attention as a recording medium. Recently, large capacity optical disks, such as a Digital Versatile Disk-Recordable (DVD-R), a DVD-Rewritable (DVD-RW) and a DVD-Random Access Memory (DVD-RAM), are being used for information recording devices, due to the short-wavelength of a semiconductor laser used as a radar light source, a small-sized spot diameter formed by an objective lens having a high Numerical Aperture (NA), and the use of a thin substrate.

When information is provided from a personal computer and recorded on a CD-R, the information is converted into an Eight-to-Fourteen Modulation (EFM) signal and recorded on the CD-R. A difference in the composition of a dye recording layer constituting the optical disk causes a failure in mark forming resulting from the heat accumulation of the recording medium or insufficient cooling speed. For this reason, a desired land or space cannot be formed even though an attempt to record an EFM signal without change is made.

A method of determining a recording parameter intrinsic to each optical disk with respect to a reference recording waveform (hereinafter referred to as a "write strategy") and maintaining desired recording quality is used.

It is known that the write strategy has a close relationship to recording speed, as do the dye of an optical disk, phase changing material, the thickness of a dye film, or the shape of a groove.

In general, typical write strategies include a method of varying the ratio of pits (marks) to lands (spaces), a method of adding an additional pulse to the front end of a recording pulse, a method of changing the rising or falling position of a pulse using a combination of pits and lands, and a method of making a multi-pulse of a recording pulse.

The method of varying the ratio of pits and lands functions to radiate a short pulse onto an optical disk at high write power and improve the shapes of the front and rear ends of a generated pit by shortening a pit length at the time of low-speed recording.

The method of adding an additional pulse to the front end of a recording pulse functions to improve the shape of a generated pit front end at which it is difficult to convert laser radiation into heat.

The method of changing the rising or falling position of a pulse using a combination of pits and lands can make the distribution of the lengths of formed pits and lands uniform by changing the position of the rear end of a land depending on the length of a previous land because the heat of a previous pit is transmitted to the land and influences a next pit, changing the position of the front end of a recording pit depending on the length of the recording pit because the heat of the recording pit is transmitted forward, changing the position of the rear end of a recording pit depending on the length of the recording pit because the heat of the recording pit is transmitted rearward, or changing the position of the front end of a land depending on the length of a next land because the heat of the next pit is transmitted to and influences the next land.

The method of making a multi-pulse of a recording pulse is a method that is used for a phase-change disk, such as a CD-RW, or a DVD. When information is recorded on the phase-change disk using a continuous pulse, the heat of the phase-change disk itself causes recorded information to be erased from the front end of a pit, so that a multi-pulse having a cooling period between pits is used.

Such a write strategy is optimized and used for each type of optical disk due to the difference in the composition of a dye recording layer constituting the optical disk or the difference in recording speed and, therefore, drive manufacturers require a long period and many processes to optimize the write strategy.

Since there are so many types of commercialized optical disks that drive manufacturers cannot know them all, it is impossible for the drive manufactures to prepare strategies appropriate for all the optical disks on the market.

In order to solve the above problem, a method (for example, Japanese Unexamined Patent Publication No. 2000-30254) of recording information about variant write strategies on a plurality of tracks in the test area of an optical disk and selecting a write strategy that minimizes reproduction jitter, and a method (for example, Japanese Unexamined Patent Publication No. 2003-30837) of recording information using a special recording pattern and acquiring a combination of marks and spaces that minimizes a jitter value or deviation value have been proposed.

However, in the former method, a finally selected write strategy is merely the best of set write strategies, and is not necessarily an optimal write strategy for an optical disk in use. Furthermore, this method is problematic in that only a recording area required for a test occupies the tracks.

In the latter method, since special recording pattern is used, sufficient consideration is not given to an influence on other marks or spaces when a specific mark or space is changed, so that it is difficult to set an optimal write strategy for an optical disk in use using one recording and reproduction test.

SUMMARY OF THE INVENTION

Accordingly, the present invention has been made keeping in mind the above problems occurring in the prior art, and an object of the present invention is to provide an optical disk device and program that are capable of setting an optimal parameter for an optical disk in use within a short period of time without using a special recording pattern and having special know-how.

In order to accomplish the above object, the present invention provides an optical disk device for recording or reproducing information on or from an optical information recording medium by forming marks and spaces on the optical information recording medium, the device includes a jitter value measurement unit for measuring a jitter value of a reproduction signal; a measurement unit for measuring lengths of marks and spaces that are recorded on the optical information recording medium using a reference write strategy or a write strategy in which at least one set parameter is varied for combinations of a plurality of kinds of marks and spaces with respect to the reference write strategy; measured value memory for storing the measured lengths of the marks and the spaces, and theoretical length memory for storing theoretical lengths of the marks and the spaces; a deviation value calculation unit for calculating deviation values of the marks and the spaces, which result from the varied write strategy, based on the lengths of the marks and spaces stored in the measured value memory and the theoretical lengths of the marks and spaces stored in the theoretical length memory; a flexibility amount calculation unit for calculating amounts of intrinsic flexibility of all marks and spaces using the calculated deviation value and probabilities presence of the marks and the spaces; a correction value calculation unit for calculating a correction value for the reference write strategy based on the calculated amounts of intrinsic flexibility and probabilities of presence of all marks and spaces so that the deviation values of all marks and spaces fall within a predetermined range; and a jitter value calculation unit for calculating a jitter value, which is obtained when information is recorded using the write strategy set by a write strategy setting unit, from the deviation value acquired from the calculated correction value calculated by the correction value calculation means, the measured jitter value before correction measured by the jitter value measurement unit, and the number of samples.

The present invention also provides a program for recording or reproducing information on or from an optical information recording medium by forming marks and spaces on the optical information recording medium, the program executing the steps of measuring lengths of marks and spaces that are recorded on the optical information recording medium using a reference write strategy or a write strategy in which at least one set parameter is varied for combinations of a plurality of kinds of marks and spaces with respect to the reference write strategy; storing the measured lengths of the marks and the spaces, and a theoretical length memory for storing theoretical lengths of the marks and the spaces; calculating deviation values of the marks and the spaces, which result from the varied write strategy, based on the lengths of the marks and spaces stored in the measured value memory and the theoretical lengths of the marks and spaces stored in the theoretical length memory; calculating amounts of intrinsic flexibility of all marks and spaces using the calculated deviation value and probabilities presence of the marks and the spaces; calculating a correction value for the reference write strategy based on the calculated amounts of intrinsic flexibility and probabilities of presence of all marks and spaces so that the deviation values of all marks and spaces fall within a predetermined range; and calculating a jitter value, which is obtained when information is recorded using the write strategy set by a write strategy setting unit, from the deviation value acquired from the calculated correction value calculated by the correction value calculation means, the measured jitter value before correction measured by the jitter value measurement unit, and the number of samples.

In accordance with the above-described inventions, the amount of intrinsic flexibility of all marks and spaces can be calculated from the probabilities of presence of the marks and the spaces, and the deviations of theoretical lengths of the marks and the spaces, which are recorded on the optical information recording medium using the reference write strategy or the write strategy in which at least one set parameter is varied for the combinations of the plurality of kinds of marks and spaces with respect to the reference write strategy and, therefore, the amounts of intrinsic flexibility of each optical information recording medium can be determined in a short time when recording is performed using the same write strategy through two recording operations. The jitter value can be calculated from the acquired deviation value, the measured jitter value before correction, which is measured by the jitter value calculation unit, and the number of samples, and, therefore, the optimal write strategy can be set using the jitter value without having the specific know-how.

The present invention further provides for a device that includes a write power determination means for determining whether write power is optimal based on sums of amounts of extension and contraction of the marks and the spaces, which are calculated by the flexibility amount calculation unit, and a predetermined reference value.

The present invention also provides the program for executing the steps of determining whether write power is optimal based on sums of amounts of extension and contraction of the marks and the spaces, which are calculated by the flexibility amount calculation unit, and a predetermined reference value.

In accordance with the above-described inventions, the write power determination means can determine whether the write power is optimal based on the sums of the amounts of extension and contraction of the marks and the spaces that are calculated by the flexibility amount calculation unit. Accordingly, if the write power is not optimal, the setting of the write strategy can be stopped, thereby reducing useless processing time.

The present invention further provides a device that includes a calculation determination means for determining whether to perform calculation of the jitter value using the jitter value calculation unit based on the ratio of average values of the amounts of extension and contraction of the marks and the spaces, which are calculated by the flexibility amount calculation unit, to the standard deviation, and a predetermined reference value.

The present invention also provides the program for executing the steps of determining whether to perform calculation of the jitter value using the jitter value calculation unit based on the ratio of average values of the amounts of extension and contraction of the marks and the spaces, which are calculated by the flexibility amount calculation unit, to the standard deviation, and a predetermined reference value.

In accordance with the above-described inventions, the calculation determination means can determine whether to calculate the jitter value using the jitter value calculation unit based on the ratio of the average values and the standard deviations. That is, when the calculated ratio exceeds a predetermined reference value, the write strategy acquired at subsequence steps is thought to be inappropriate from an empirical point of view. Therefore, in this case, the subsequent steps are not performed, thereby reducing useless processing time.

BRIEF DESCRIPTION OF THE DRAWINGS

The above and other objects, features and advantages of the present invention will be more clearly understood from the following detailed description taken in conjunction with the accompanying drawings, in which:

FIGS. 3(a)-3(c) are views illustrating an example of an acquired deviation;

FIGS. 11(a)-11(c) are views illustrating an example of determining whether to perform jitter calculation;

FIGS. 12(a)-12(b) are views illustrating an example of determining whether to perform jitter calculation;

FIGS. 15(a)-15(c) are tables illustrating an example of jitter calculation; and

DETAILED DESCRIPTION OF THE INVENTION

Figure 1:
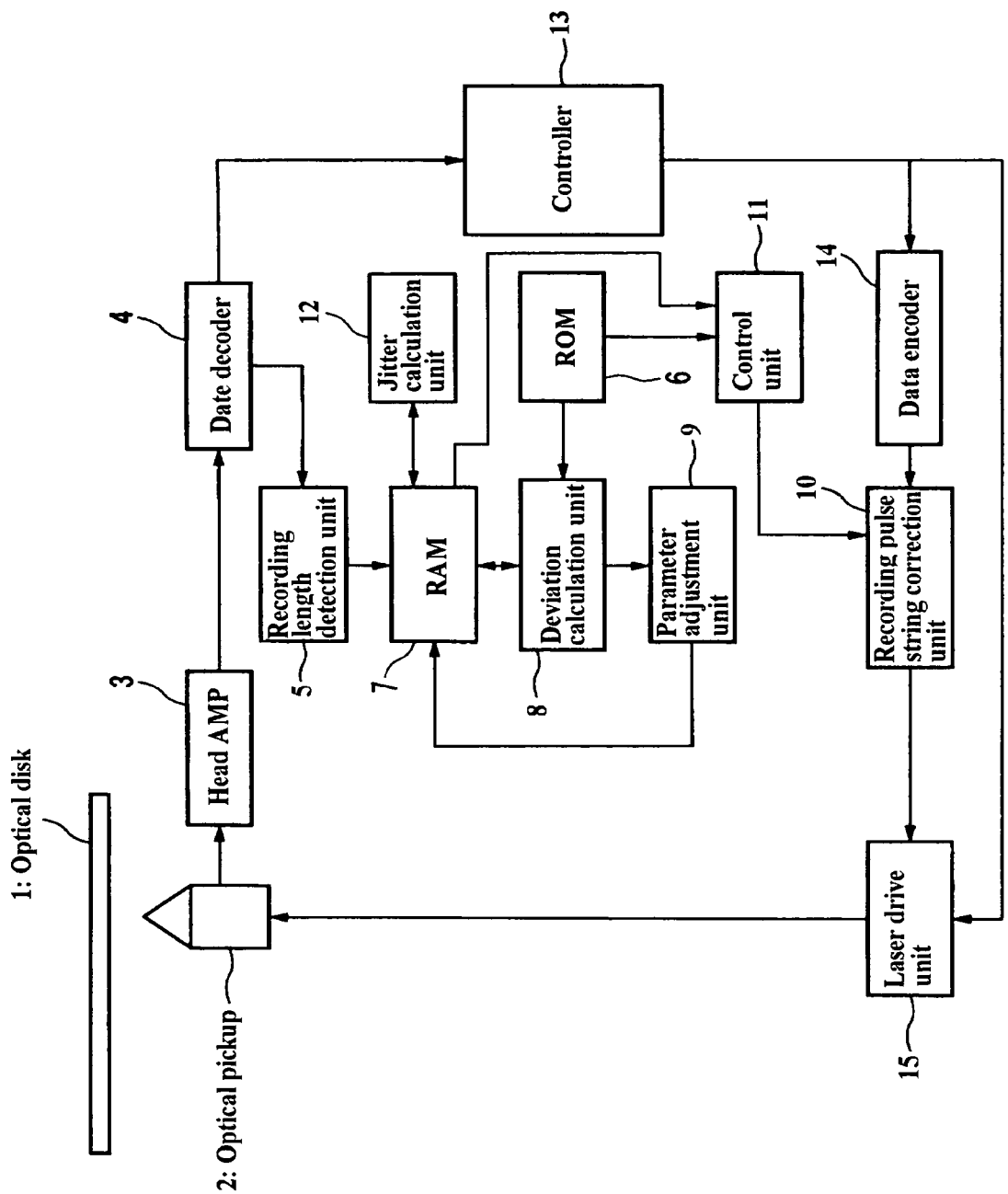
FIG. 1 is a view illustrating the construction of an optical disk device.

Reference now should be made to the drawings, in which the same reference numerals are used throughout the different drawings to designate the same or similar components.

An optical disk device according to the present embodiment, as shown in FIG. 1, includes an optical disk 1, an optical pickup 2, a head amplifier 3, a data decoder 4, a recording length detection unit 5, Read-Only Memory (ROM) 6, RAM 7, a deviation calculation unit 8, a parameter adjustment unit 9, a recording pulse string correction unit 10, a control unit 11, a jitter calculation unit 12, a controller 13, a data encoder 14, and a laser drive unit 15.

The optical disk 1 is an optical information recording medium for recording, reproducing and erasing information using a semiconductor laser. The optical disk 1 may be, for example, a CD-R, a CD-RW, a DVD-R, a DVD-RW or a DVD-RAM.

The optical pickup 2 includes a laser light source, such as a laser diode (not shown), optical parts, such as a collimator lens, an objective lens driven by a focus actuator or a tracking actuator, a polarized beam splitter and a cylindrical lens, and a 4-segment or 2-segment Photo Detector (PD) configured to have four or two segments and convert light into an electrical signal, or a front monitor diode configured to monitor laser output at the time of recording and reproducing information.

The head amplifier 3 detects light reflected from the optical disk 1, calculates the amount of reflected light based on the reflected light and generates a Radio Frequency (RF) signal that represents the total amount of light reflected to the individual segments of the 4-segment PD, and, simultaneously, generates a Focus Error signal (FE) indicating the deviation of a laser, which is radiated from the optical pickup 2, from focus using an astigmatic method. Meanwhile, the optical pickup 2 generates a Tracking Error signal (TE) indicating the deviation of the radiated laser from a track using a push-pull method. Furthermore, in the present embodiment, the head amplifier 3 functions to measure the jitter value of a generated RF signal, and detect asymmetry in the RF signal.

The data decoder 4 generates an EFM signal from the RF signal generated by the head amplifier 3, converts the generated EFM signal into a desired form and outputs the converted signal to the controller 13.

The recording length detection unit 5 receives the EFM signal from the data decoder 4, and measures the pulse width of the received EFM signal using a time measurement circuit (not shown). The ROM 6 is unrewritable memory, and stores a control program for controlling the entire optical disk device, reference write strategy, theoretical mark and space strengths, and the probability of presence of combinations of marks and spaces.

The RAM 7 is rewritable memory, and temporarily stores the correction amount of each optical disk, a measured recording length input from the recording length detection unit 5, the deviation value between the measured recording length and the theoretical mark length and space length, the amount of intrinsic flexibility of each mark and space, a measured jitter value, write power, the flexibility amount of each mark and space, the number of samples, or the correlation between each write strategy (correction value) and the calculated jitter value.

The deviation calculation unit 8 calculates the differential value of deviations by comparing the stored measured recording length, the stored theoretical mark and space length and the previously calculated deviation values with each other.

The parameter adjustment unit 9 calculates a correction value for the reference write strategy based on the amounts of intrinsic flexibility of all marks and spaces stored in the RAM 7 and the probability of presence stored in the ROM 6 so that the deviation values of all marks and spaces can fall within a predetermined range.

The recording pulse string correction unit 10 receives the correction value, which is stored in the RAM 7, from the control unit 11, and corrects a recording pulse string to an optimal recording pulse string for the optical disk based on the received correction value.

The control unit 11 controls the entire optical disk device according to a control program so as to record and reproduce information on and from the optical disk. In the present embodiment, for example, the control unit 11 reads a write strategy causing the optimal jitter value from the RAM 7, and outputs the correction value for the read write strategy to the recording pulse string correction unit 10.

The controller 13 provides a recording signal to the data encoder 14 and reads a recording signal from the data decoder 4. The data encoder 14 converts the recording signal, which is provided by the controller 13, into an EFM signal, and outputs the converted EFM signal to the recording pulse string correction unit 10. The laser drive unit 15 generates a laser-diode driving pulse signal depending on the received recording pulse, and provides the generated pulse signal to a semiconductor laser (not shown) of the optical pickup 2.

With reference to FIGS. 2 to 4a, a method of calculating the amount of intrinsic flexibility of each mark and space is described.

In the present embodiment, the degree of influence occurring when the length of another space or mark varies is acquired using the probability of presence of the combination of each mark and space, and the amount of intrinsic flexibility of each mark and space is calculated using the acquired degree of influence.

Figure 4:
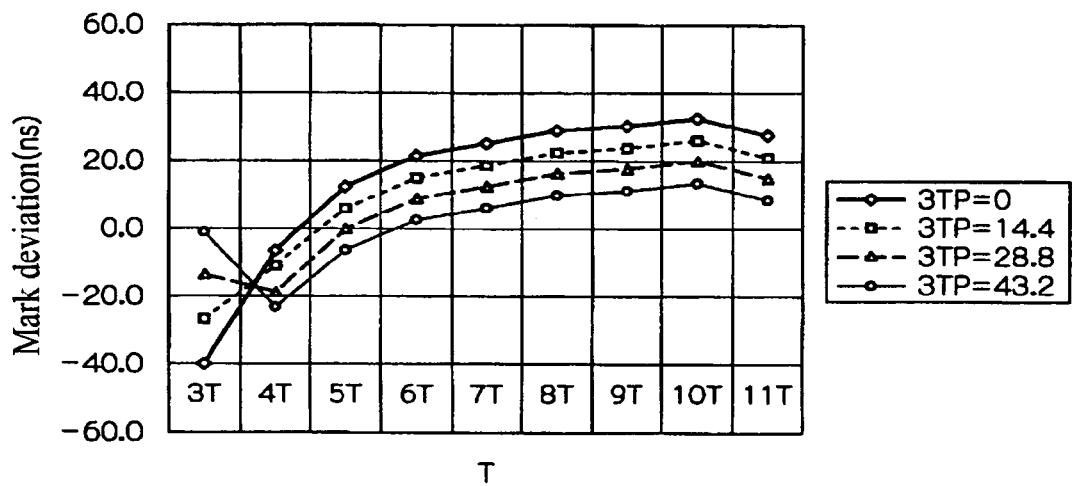
FIGS. 4(a)-4(b) are views illustrating the degree of influence on other marks when the length of a mark 3T or a mark 6T is varied.
Figure 4:
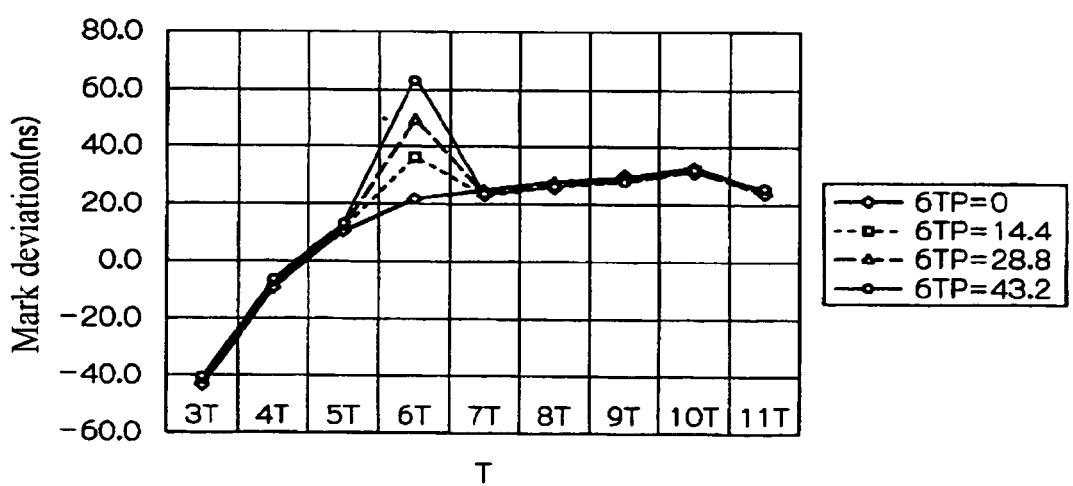

With reference to FIG. 4, a more detailed description thereof is given below. Essentially, the mark and space of the EFM signal are configured to allow the total sum of the lengths of marks to be identical with the total sum of the lengths of spaces. Accordingly, if the length of one space increases, the balance in the distribution of marks and spaces is broken. In order to compensate for the broken balance, the length of every space, including the space whose length increases, is increased. This phenomenon is represented as the variation of a slice level in an actual reproduction waveform (RF signal).

In more detail, when the length of the space 3T of the EFM signal is increased by ΔT (3T), the variations in the lengths of other spaces 4T to 11T are shown in FIG. 4a. In FIG. 4a, a vertical axis represents deviations from theoretical lengths, and a horizontal axis represents the spaces 3T to 11T. In FIG. 4a, the lines represent variations in deviation when the deviation of the space 3T is zero and deviations of 14.4 ns, 28.8 ns and 43.2 ns are added.

In this case, assuming that the probability of presence of the space 3T in the EFM signal is 33%, the relationship of the following Equation 1 is established between the variations of the spaces 4T and 11T:

$$\Delta T(3T) \times 0.33 = \Delta T(4-11T) \times (1-0.33)$$

$$\Delta T(4-11T) = 0.33/(\Delta T(4-11T) \times (1-0.33)) \quad (1)$$

In this case, it can be understood that each of the variations of the spaces 4T and 11T is about half of the variation of the space 3T. This is also supported by the actual measurement results of FIG. 4a. As shown in FIG. 4b, it can be understood that the degree of influence on the lengths of other marks or spaces is extremely small in the case where the space 6T having a low probability of presence is varied in the same manner.

Accordingly, with the probability of presence based on the combination of each mark and space, it is possible to determine the degree of influence on the lengths of other marks or spaces when the length of a specific mark or space varies.

Figure 2:
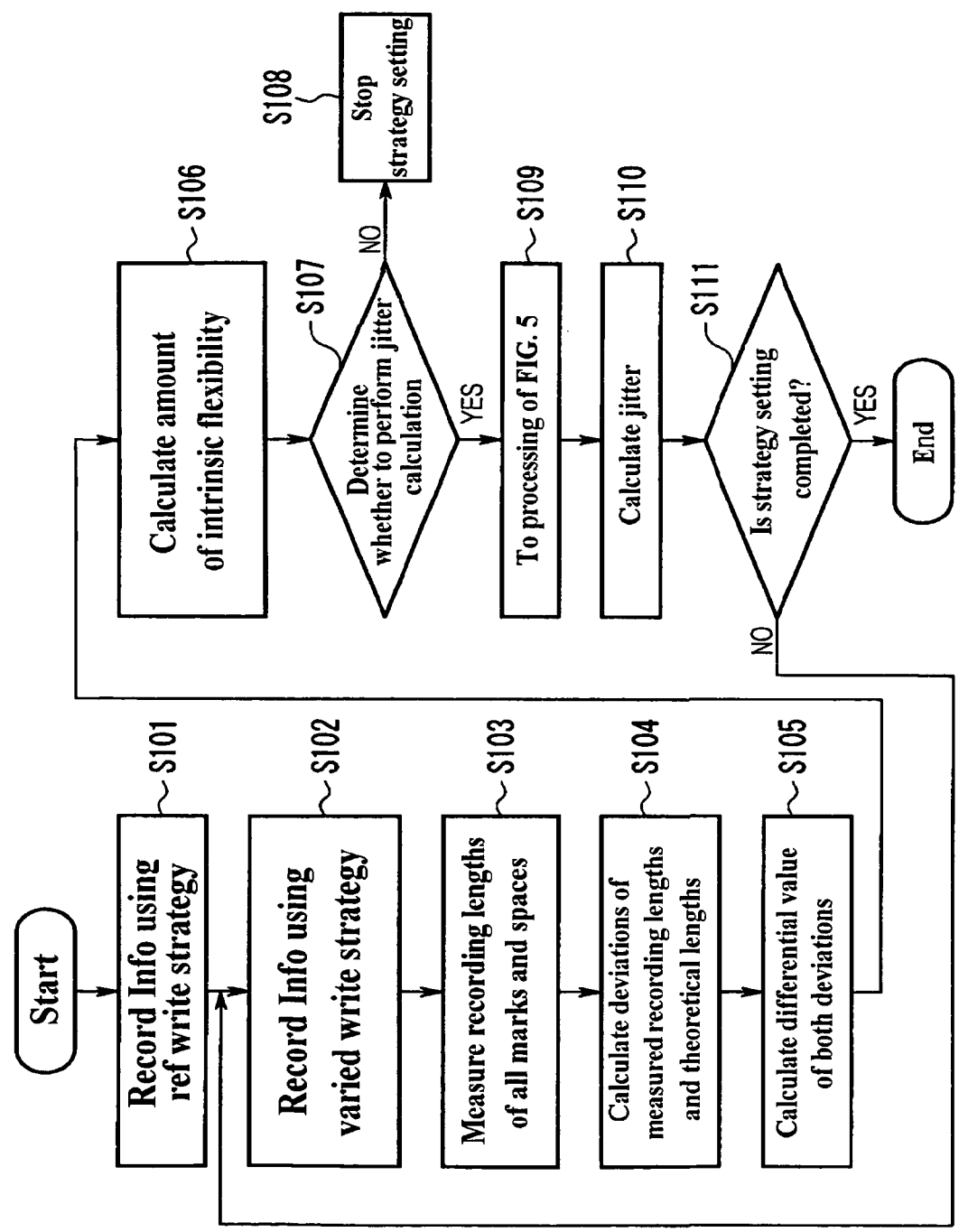
FIG. 2 is a flowchart illustrating a process of setting a write strategy.

Based on the above-described viewpoint, a method of calculating the amount of intrinsic flexibility of each mark and space is described with reference to FIGS. 2 and 3.

The control unit 11 sets the reference write strategy, which is stored in the ROM 6, for the recording pulse string correction unit 10, and performs a write operation at step S101. Thereafter, with respect to the reference write strategy, the control unit 11 performs the write operation using the write strategy in which marks 3T to 5T (3TM to 5TM) prior to the spaces 3T to 5T (3TS to 5TS), which have a high degree of influence on other marks and spaces, and a high probability of presence, are extended by an integral multiple of a minimal resolution for setting the write strategy, at step S102. When the subsequent steps are taken into consideration, it is desirable that the amount of extension be a minimal resolution. Considering that the minimal resolution is extremely small, it is desirable that the amount of extension is an integral multiple of the minimal resolution to reduce the influence of an error.

After each write operation has been completed, each recording signal is reproduced, and the recording length detection unit 5 measures recording lengths for all the combinations of marks and spaces, and stores the measured recording lengths in the RAM 7 for individual write strategies at step S103.

The deviation calculation unit 8 calculates the deviations between recording lengths acquired when a recording operation is performed using the reference write strategy stored in the ROM 6 and the stored theoretical lengths for all the combinations of marks and spaces stored in ROM 6 (refer to FIG. 3a), and calculates the deviations between the recording lengths acquired when a recording operation is performed using the write strategy where the mark and the space are extended by an integral multiple of the minimal resolution and the stored theoretical lengths for all the combinations of marks and spaces stored in the ROM 6 (refer to FIG. 3b) at step S104. Thereafter, the deviation calculation unit 8 calculates the deviation values between the calculated deviations (refer to FIG. 3c) at step S105. When the amount of extension of the marks 3T to 5T prior to the spaces 3T to 5T for the reference write strategy is an integral multiple of the minimal resolution, the acquired deviation values are divided by the integer, and the quotients are used as the deviation values for the minimal resolution.

The amount of intrinsic flexibility of each mark and space is calculated from a deviation value calculated as shown in FIG. 3c, using the probability of presence for the combination of each mark and space. For example, with the horizontal axis of 3TP of FIG. 3c focused on, the amount of intrinsic flexibility for the combination of the mark 3T and the space 3T is acquired by eliminating the influence of variations of other marks and spaces from a deviation value for the combination of the mark 3T and space 3T. Therefore, if it is assumed that "ΔT(3,3)", "ΔT(4,3)" and "ΔT(5,3)" denote the amounts of intrinsic flexibility for the combinations of the mark 3T and the space 3T, the space 4T and the space 5T, respectively, and "R(3,3)", "R(4,3)" and "R(5,3)" denote the probabilities of presence for the combinations, respectively and "A" denotes the deviation value of the mark 3T and the space 3T, the following Equation 2 is derived.

$$\Delta T(3,3) \times \Delta T(4,3) \times R(4,3)/(1-R(4,3)) - \Delta T(5,3) \times R(5,3)/(1-R(5,3)) = A \quad (2)$$

Meanwhile, with the bolded box of FIG. 3c focused on, in the combinations including the mark 6T or the space 6T, deviation between approximate values exists in each combination even though the mark 6T or the space 6T does not vary. This deviation reflects influence resulting from the variations in the lengths of the marks 3T to 5T prior to the spaces 3T to 5T.

Accordingly, when "Z" denotes the deviation value of the mark 3T and the space 6T, the deviation value Z is expressed by the following Equation 3. If Equation 3 is substituted into Equation 2, Equation 4 is derived. When Equation 4 is expressed using the numerical values of FIG. 3c, Equation 5 is derived. The amount of intrinsic flexibility for the combination of each mark and space can be calculated using Equation 5 because the probability of presence of the combination of each mark and space is definite, at step S105.

$$Z = \Delta T(3,3) \times R(3,3)/(1-R(3,3)) + \quad (3)$$
$$\Delta T(4,3) \times R(4,3)/(1-R(4,3)) + \Delta T(5,3) \times R(5,3)/(1-R(5,3))$$

$$\Delta T(3,3) = (Z+A)(1-R(3,3)) \quad (4)$$

$$\Delta T(3,3) = (-2.4-7.7) \times (1-R(3,3))$$

$$\Delta T(3,4) = (-2.0-7.7) \times (1-R(3,4))$$

$$\Delta T(3,5) = (-0.7-7.7) \times (1-R(3,5))$$

$$\Delta T(5,5) = (-9.6-7.7) \times (1-R(5,5)) \quad (5)$$

Figure 5:
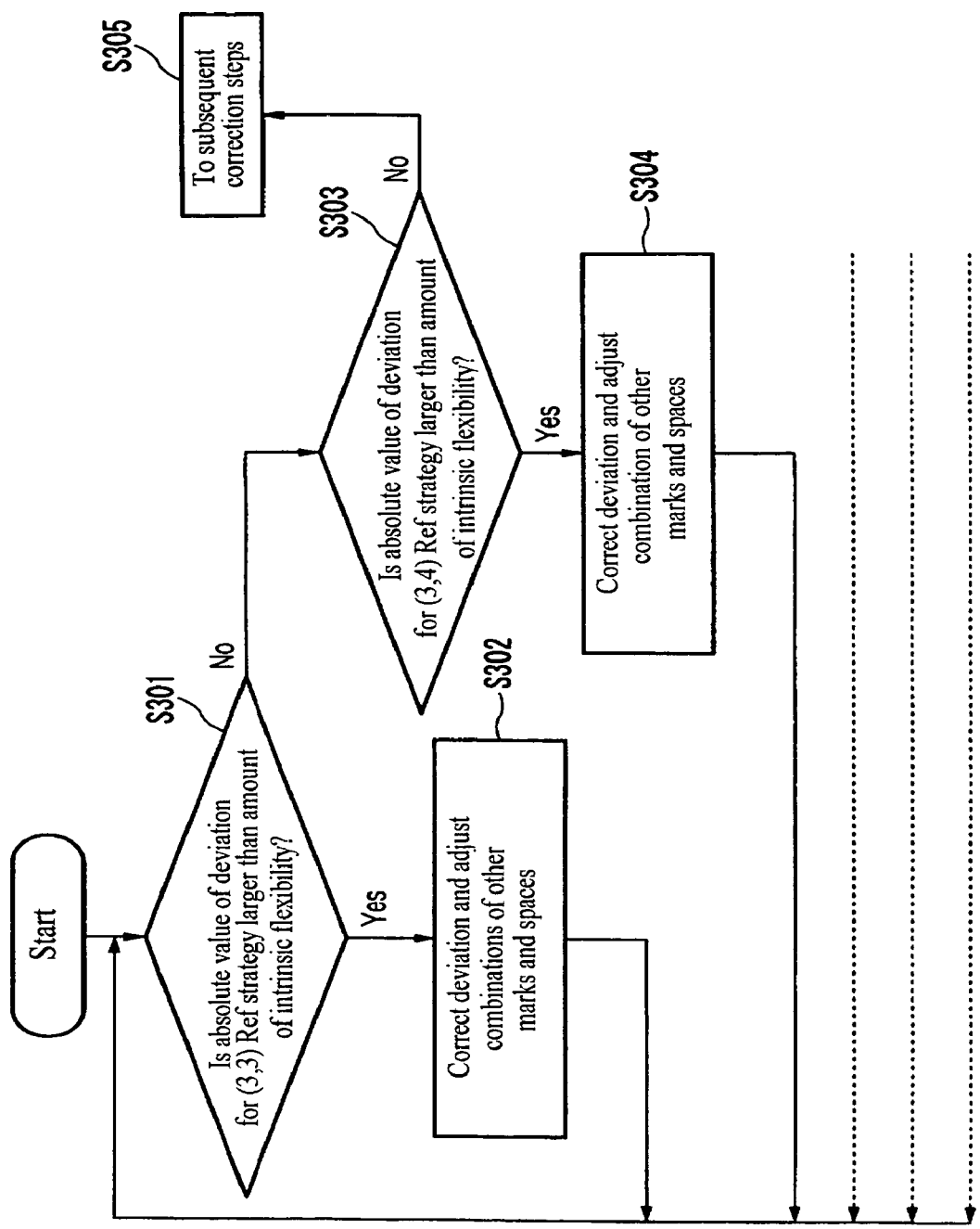
FIG. 5 is a flowchart illustrating a sequence for obtaining an optimal write strategy.

When the amount of intrinsic flexibility of the combination of each mark and space is acquired, a correction value that allows the deviation to approach zero is calculated as shown in FIG. 5. However, there are cases where the calculation of the correction value should be stopped according to certain conditions. These conditions are based on whether write power is appropriate, and whether the distribution of the amounts of intrinsic flexibility is appropriate. Before FIG. 5 is described, a method of determining whether to perform subsequent steps is described below.

A method of determining whether write power is appropriate is described with reference to FIGS. 7 to 10.

Figures 6, 7:
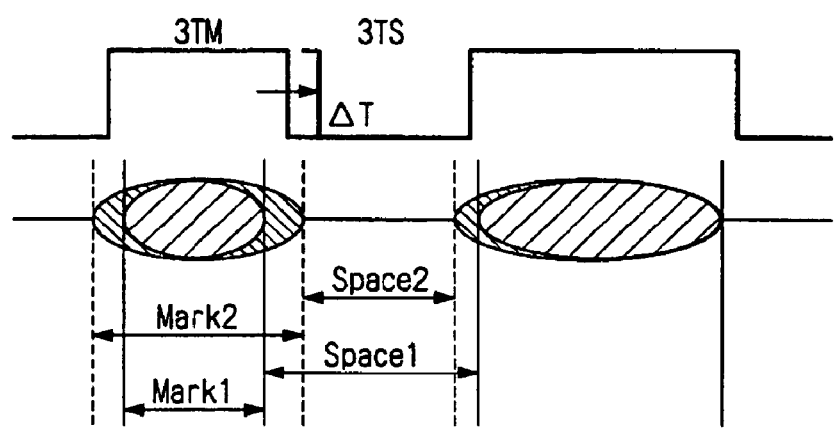
FIG. 6 is a view illustrating an adjustment sequence for obtaining an optimal write strategy.
FIG. 7 is a view illustrating the influence of a write power on a mark or a space.

As shown in FIG. 7, for example, when, in the combination of the mark 3T (3TM) and the space 3T (3TS), information in which a 3TM pulse extends by ΔT toward a rear 3TS is recorded, the mark 3T created on the optical disk generally extends toward the rear 3TS. However, there may occur a phenomenon in which the mark 3T extends forward, or the front end of the next mark extends forward. This phenomenon is known to result from the type of optical disk (for example, the dye used or the film thickness thereof), write power or write speed. In particular, write power has great influence on the phenomenon.

In FIG. 7, if it is assumed that "Mark1" denotes the length of the mark 3T before the extension of the pulse length, "Mark2" denotes the length of the mark 3T after the extension of the pulse length, "Space1" denotes the length of the space 3T before the extension of the pulse length and "Space2" denotes the length of the space 3T after the extension of the pulse length, the mark is thought to be extended when the total length of Mark1 and Space1 is shorter than the total length of Mark2 and Space2, and thermal interference between the marks is thought to occur when the total length of Mark1 and Space1 is longer than the total length of Mark2 and Space2.

Figure 8:
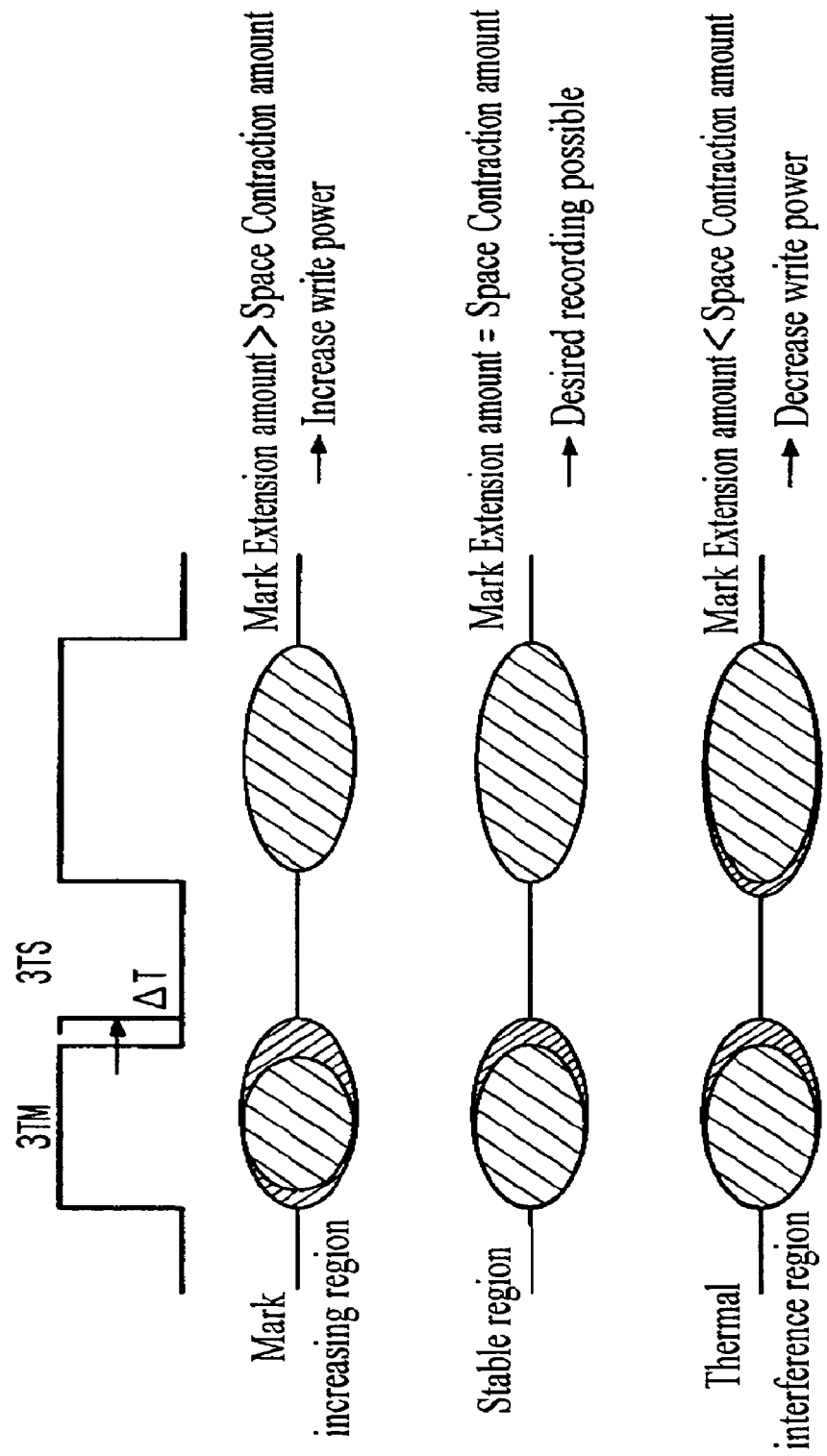
FIG. 8 is a view illustrating the relationship between write power and the amount of flexibility of a mark or a space.

That is, as shown in FIG. 8, when the amount of extension of the mark is larger than the amount of contraction of the space, the write power is thought to be positioned in a mark increasing region, so that the write power needs to increase. When the amount of extension of the mark is the same as the amount of contraction of the space, the write power is thought to be positioned in a mark stable region so that the write power is maintained. When the amount of extension of the mark is smaller than the amount of contraction of the space, the write power is though to be positioned in a mark thermal interference region, so that the write power needs to decrease. By adjusting the write power, the optimal write power corresponding to each optical disk can be set.

Figure 9:
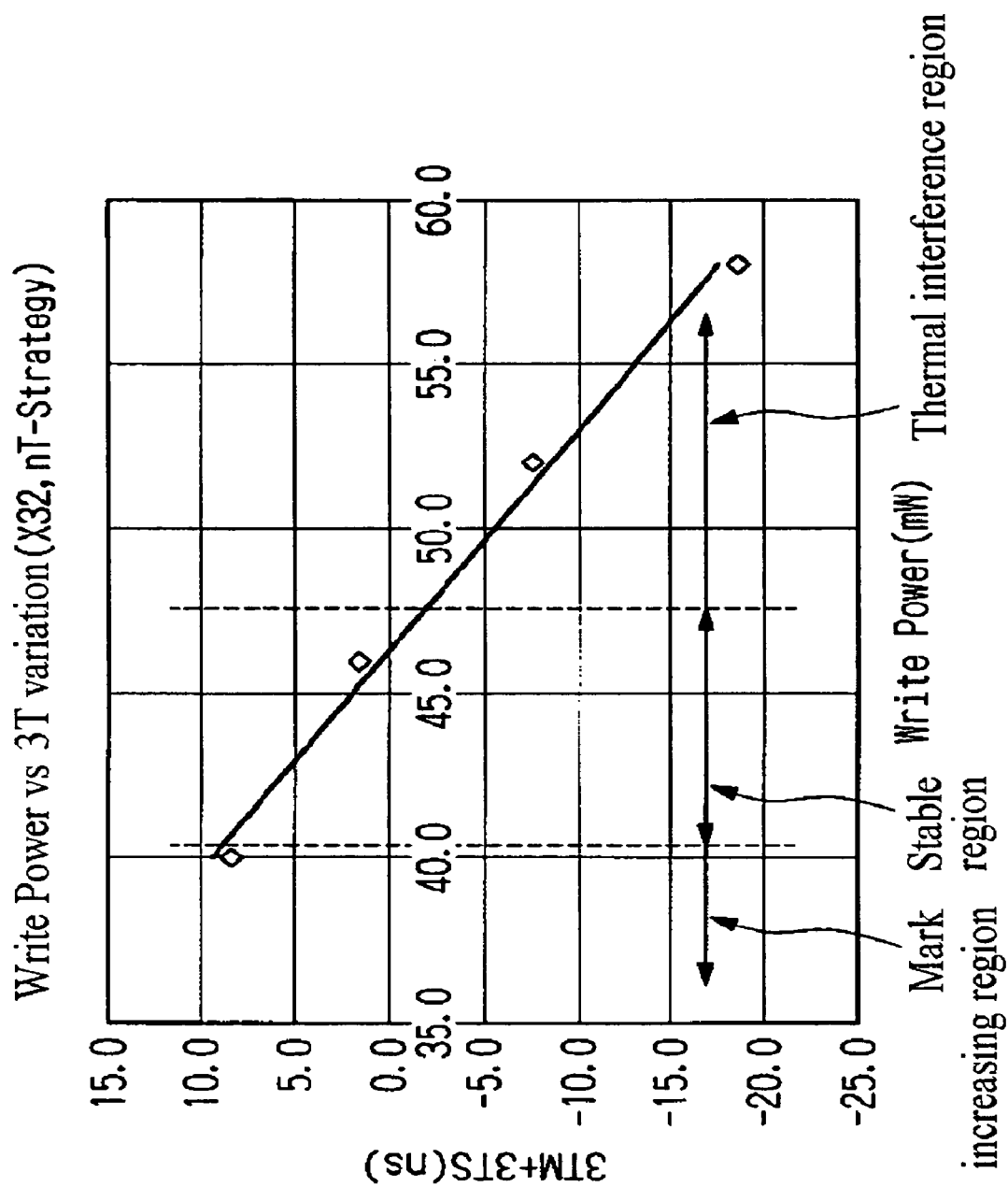
FIG. 9 is a view illustrating the relationship between the variation of write power and the variation of a 3T.

FIG. 9 is a view illustrating the relationship between the variation of write power and the variation of the mark 3T and the space 3T. The variation of the write power and the variation of the mark 3T and the space 3T have a linear relationship. When the write power is increased, the variation of the mark 3T and the space 3T increases in inverse proportion to the increase in the write power.

In general, the write power is a principal factor in determining the quality of the recording signal. Accordingly, in the case where the write strategy is set using inappropriate write power, write quality is degraded. In the case where the write strategy is set without considering the write power, the set write strategy itself is useless. Therefore, when the speed at which the write strategy is set is taken into consideration, there are some cases in which it is preferable to stop setting the write strategy according to the value of the write power.

The optical disk device of the present embodiment includes a unit for determining whether the write power is appropriate. According to the determination result, the subsequent steps of the write strategy may not be performed. A detailed determination method is, for example, to sum up the variations of the mark 3T and the space 3T in the case where the recording of information is performed with the 3TM pulse extended by ΔT toward the rear 3TS in the case where the recording of information is normally performed in conjunction with the combination of the mark 3T (3TM) and the space 3T (3TS). Thereafter, the average value of the variations of the marks 3T to 5T and the spaces 3T to 5T is acquired, and a value "A" is acquired by dividing the previously acquired sum of the variations of the mark 3T and the space 3T by the average value, at step S401.

Figure 10:
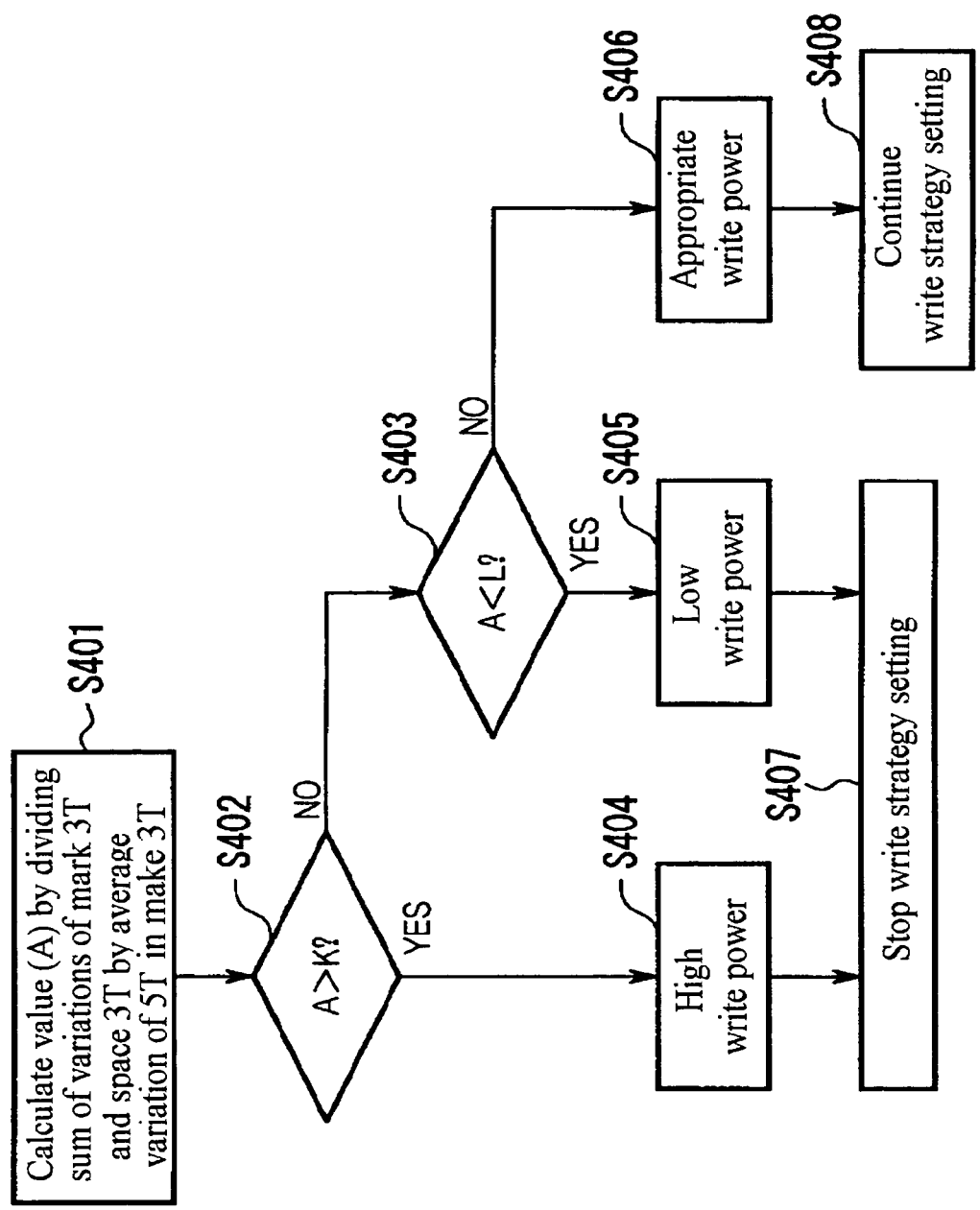
FIG. 10 is a flowchart illustrating a process of determining whether write power is appropriate.

Next, whether the acquired "A" is larger than a predetermined "K" is determined at step S402. If the acquired "A" is larger than the predetermined "K", the present write power is positioned in the mark increasing region of FIG. 9 at step S404. Accordingly, the process of setting the write strategy is stopped at step S407 as illustrated in FIG. 10.

If the acquired "A" is smaller than the predetermined "K" at step S402, whether the acquired "A" is smaller than the predetermined "L" is determined at step S403. In the case where the acquired "A" is smaller than the predetermined "L", the present write power is positioned in the thermal interference region of FIG. 9 at step S405. Accordingly, the process of setting the write strategy is stopped at step S407.

In the case where the acquired "A" is larger than a predetermined "L" at step S403, the present write power is positioned in the stable region of FIG. 9 at step S406. Accordingly, the process of setting the write strategy continues at step S408. The reason why the acquired "A" used to determine whether the write power is appropriate is calculated based on the sum of the variations of the mark 3T and the space 3T and the average value of the variations of the marks 3T to 5T and the spaces 3T to 5T is that influence is thought to be considerable in the marks 3T to 5T and the spaces 3T to 5T if the probability of presence of each mark and space is taken into consideration, for example, when the recording of information in which the 3TM pulse is extended by ΔT toward the rear 3TS is performed.

Next, a method of determining whether the distribution of the amounts of intrinsic flexibility calculated at steps S101 to S106 is appropriate is described with reference to FIGS. 11 and 12.

FIGS. 11a, 11b and 11c illustrate the deviations (refer to FIG. 11a) in the case where recording is performed with a pulse additionally applied to a specific space in conjunction with a specific write strategy, the deviations (refer to FIG. 11b) in the case where recording is performed using a specific write strategy, and the differential values (refer to FIG. 11c) of both deviations. The amount of intrinsic flexibility is acquired based on the combination (refer to FIG. 12a) of the marks 3T to 5T and the spaces 3T to 5T having a high probability of presence in a differential deviation table (refer to FIG. 11c), and the probability of presence of each combination (refer to FIG. 12b; these steps are the same as steps S101 to S106 of FIG. 2, and the value acquired at step S106 is used in an actual process).

When, in FIG. 12b, the distribution of the amounts of intrinsic flexibility for the combination of the marks 3T to 5T and the spaces 3T to 5T is great, the optimal write strategy cannot be acquired even though the subsequent steps are performed. The average value (AVG) and standard deviation (σ) of the amounts of intrinsic flexibility for the combination of the marks 3T to 5T and the spaces 3T to 5T of FIG. 12b are acquired, and a value "B" is calculated using the average value (AVG), the standard deviation (σ) and the following Equation 6.

$$B = \sigma/AVG \quad (6)$$

When the value "B" is larger than a predetermined value, it is determined that the setting of the write strategy is inappropriate, and the subsequent step of calculating the jitter value is not performed. If the value "B" measured using write speed as a parameter for various types of optical disks exceeds 0.35, it is rather preferred that the setting of the write strategy is stopped. In the example of FIG. 12b, when the value "B" of 0.382 is acquired using the standard deviation of 5.84 and the average value of 15.3, the stopping of the setting of the write strategy is determined to be preferable at step S108.

Next, the case where the process is continued at step S106 is described with reference to FIGS. 5 and 6.

A method of calculating the correction value according to the present invention is to set the optimal write strategy by suppressing the write strategy to lower than the minimal resolution using the amount of intrinsic flexibility corresponding to the above-described minimal resolution in the case where the recording of information is performed using the reference write strategy.

The input of the correction values of individual marks and spaces is characterized by being processed in the ascending order of the probabilities of presence. That is, if the combination of a mark and a space having a high probability of presence is adjusted (refer to the processing order of FIG. 6), each correction value is adjusted in a short time by starting to perform processing on one having greater influence on the combinations of other marks and spaces.

In more detail, as shown in FIG. 5, it is determined whether the absolute value of the deviation for the reference write strategy is larger than the amount of intrinsic flexibility for the combination of the mark 3T and the space 3T having the highest probability of presence step S301. If the absolute value is larger than the amount of intrinsic flexibility, the deviation is corrected and, simultaneously, the deviation value is adjusted based on the probability of presence for the combinations of other marks and spaces at step S302.

Meanwhile, if the absolute value of the deviation for the reference strategy is smaller than the amount of intrinsic flexibility, it is determined whether the absolute value of the deviation for the reference write strategy is larger than the amount of intrinsic flexibility for the combination of the mark 3T and the space 4T having the next highest probability of presence at step S303. The adjustment for the combination of the mark 3T and the space 4T is processed in the same manner as the combination of the mark 3T and the space 3T at step S304. This process is performed on up to the combination of the mark 11T and the space 11T.

After the write strategy has been determined by processing FIG. 5, the jitter value is calculated at step S109. The calculating of the jitter value is briefly described with reference to FIGS. 13 to 15.

Figures 12, 13:
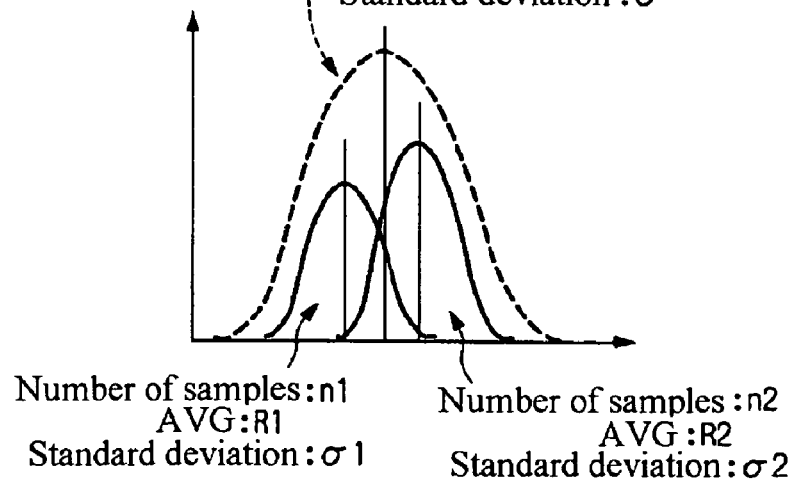
FIG. 13 is a conceptual view illustrating the combination of a plurality of distributions.

In general, when a single distribution is produced by combining the distributions of two data, the standard deviation σ after the completion of combination can be acquired from FIG. 13 and Equation 7. The standard deviation σ is identical to the jitter value in the embodiment of the present invention.

That is, the standard deviation (σ) of combined distribution in which the distribution of the numbers of samples $n_1$, averages $R_1$ and standard deviations $\sigma_1$ is combined with the distribution of the numbers of samples $n_2$, averages $R_2$ and standard deviations $\sigma_2$ is acquired from Equation 7. In this case, $n = n_1 + n_2$, and $R = (n_1 \cdot R_1 + n_2 \cdot R_2)/(n_1 + n_2)$.

$$\sigma^2 = \frac{1}{n_1 + n_2}[n_1(R - R_1) + n_1\sigma_1^2 + n_2(R - R_2) + n_2\sigma_2^2] \quad (7)$$

Figure 14:
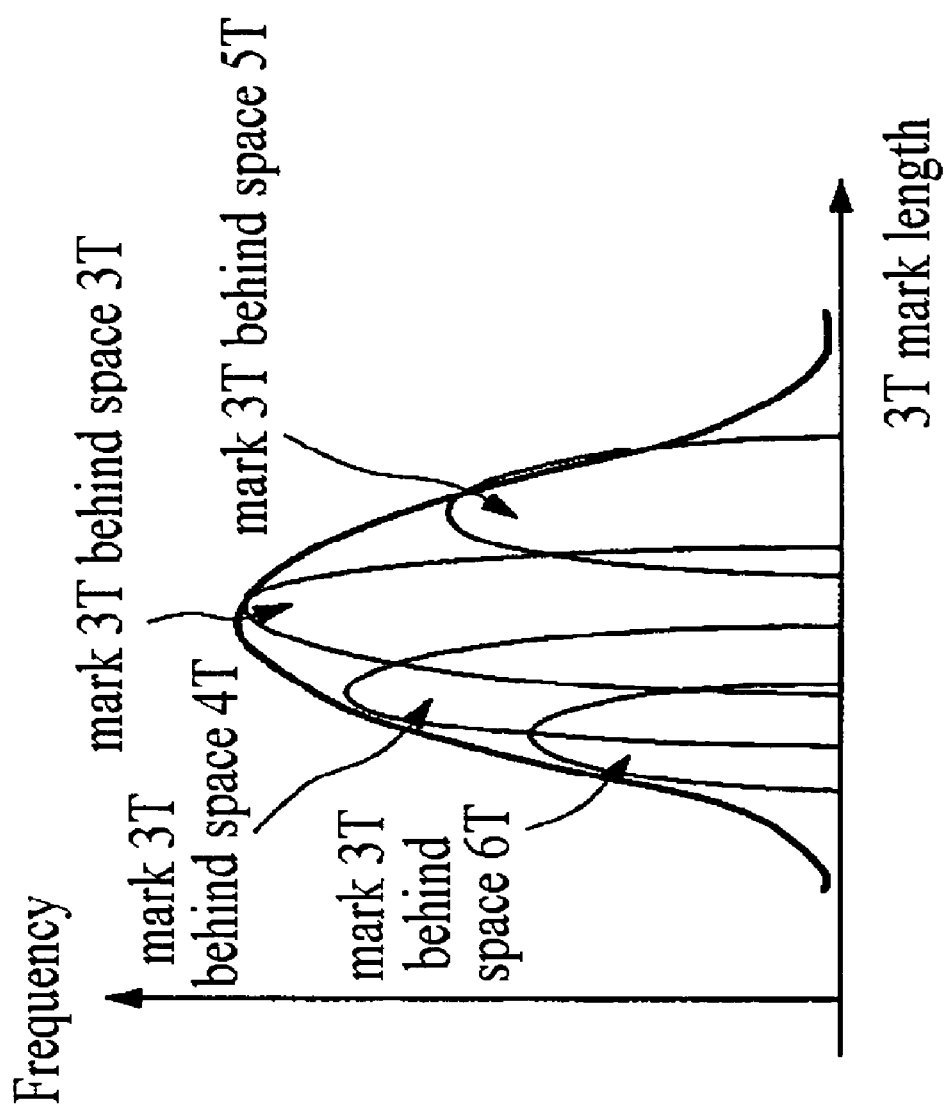
FIG. 14 is a graph illustrating the distribution of marks 3T.

For example, the distribution of the marks 3T, as shown in FIG. 14, is constructed from the nine distributions of the marks 3Ts after individual spaces. Accordingly, the number of samples, average value and standard deviation (jitter value) of each distribution are acquired, and an arithmetic operation is performed using an arithmetic equation in which the variables of Equation 7 are extended to nine variables, thus acquiring the standard deviation of combined distribution, that is, the jitter value, in the same manner as in FIG. 13.

FIGS. 15a, 15b and 15c illustrate initial jitter values (refer to FIG. 15a), the numbers of samples (refer to FIG. 15b), and the deviations after the setting of the write strategy (refer to FIG. 15c), respectively. Accordingly, the average value can be acquired for nine distributions based on the data. For example, the jitter value of the mark 3T can be acquired by substituting the average value, the number of samples and the initial jitter value into Equation 7.

Figure 16:
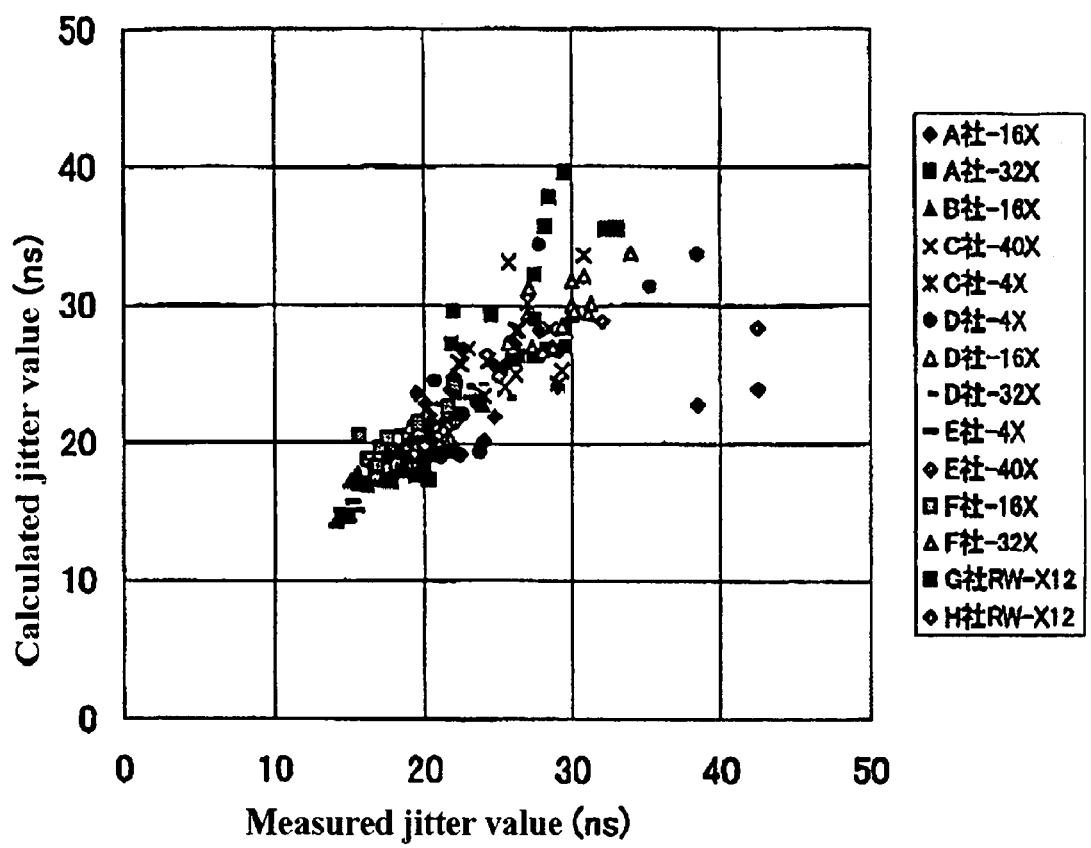
FIG. 16 is a graph illustrating the relationship between calculated jitter values and measured jitter values.

FIG. 16 illustrates the relationship between the jitter values calculated using the above method and the measured jitter values for individual optical disks. From FIG. 16, it can be understood that the calculated jitter values and the measured jitter values have a close relationship. In the embodiment of the present invention, the optimal write strategy can be set for each optical disk without having special know-how because the set write strategy can be evaluated using the jitter value that is an objective criterion.

In accordance with the present invention, there is an advantage in that an optimal write strategy considering the influence of other marks and spaces can be set without using a special recording pattern.

Additionally, the present invention is advantageous in that the optimal write strategy can be set by recording and reproducing a small amount of information using the probability of presence of each mark and space.

Additionally, useless processing time can be reduced because whether the process is continued can be determined based on the value acquired in the process of setting the write strategy.

Furthermore, the present invention is advantageous in that the optimal write strategy can be acquired without having special know-how because the optimal write strategy can be set based on the calculated jitter value.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical disk device for recording or reproducing information on or from an optical information recording medium by forming marks and spaces on the optical information recording medium, the optical disk device comprising:

a jitter value measurement unit for measuring a jitter value of a reproduction signal;

a measurement unit for measuring lengths of marks and spaces that are recorded on the optical information recording medium using a reference write strategy or a write strategy having at least one set parameter varied with respect to the reference write strategy;

a measured value memory for storing the measured lengths of the marks and the spaces, and a theoretical length memory for storing theoretical lengths of the marks and the spaces;

a deviation value calculator for calculating deviation values of the marks and the spaces from the varied write strategy, based on the lengths of the marks and the spaces stored in the measured value memory and the theoretical lengths of the marks and the spaces stored in the theoretical length memory;

a flexibility amount calculator for calculating amounts of intrinsic flexibility of the marks and the spaces using the calculated deviation value and probabilities of presence of the marks and the spaces;

a correction value calculator for calculating a correction value for the reference write strategy based on the calculated amounts of intrinsic flexibility and the probabilities of presence of the marks and the spaces so that the deviation values of the marks and the spaces fall within a predetermined range; and a jitter value calculator for calculating a jitter value based on the deviation values acquired from the calculated correction value calculated by the correction value calculation unit, the measured jitter value measured before calculation of the correction value by the jitter value measurement unit, and a number of samples when information is recorded using the write strategy set by a write strategy setting unit.

2. The device of claim 1, wherein the at least one set parameter of the varied write strategy is varied for combinations of a plurality of kinds of marks and spaces with respect to the reference write strategy.

3. An optical disk device for recording or reproducing information on or from an optical information recording medium by forming marks and spaces on the optical information recording medium, the device comprising:

a jitter value measurement unit for measuring a jitter value of a reproduction signal;

a measurement unit for measuring lengths of marks and spaces recorded on the optical information recording medium using a reference write strategy or a write strategy in which at least one set parameter is varied with respect to the reference write strategy;

a memory for storing the measured lengths of the marks and the spaces and theoretical lengths of the marks and the spaces;

a deviation value calculator for calculating deviation values of the marks and the spaces from the varied write strategy based on the measured and theoretical lengths of the marks and the spaces stored in the memory;

a flexibility amount calculator for calculating amounts of intrinsic flexibility of the marks and the spaces using the calculated deviation values and probabilities of presence of the marks and the spaces;

a correction value calculator for calculating a correction value for the reference write strategy based on the calculated amounts of intrinsic flexibility and the probabilities of presence of the marks and the spaces, so that the deviation values of the marks and the spaces fall within a predetermined range;

a jitter value calculator for calculating a jitter value from the deviation values acquired from the calculated correction value, the measured jitter value before calculation of the correction value, and a number of samples when information is recorded using the write strategy; and a write power determiner for determining an optimal write power based on the amounts of flexibility calculated by the flexibility amount calculator and a predetermined reference value.

4. The device of claim 3, wherein the write power determiner determines the optimal write power based on sums of amounts of extension and contraction of the marks and the spaces calculated by the flexibility amount calculator.

5. An optical disk device for recording or reproducing information on or from an optical information recording medium by forming marks and spaces on the optical information recording medium, the device comprising:

a jitter value measurement unit for measuring a jitter value of a reproduction signal;

a measurement unit for measuring lengths of marks and spaces recorded on the optical information recording medium using a reference write strategy or a write strategy in which at least one set parameter is varied with respect to the reference write strategy;

a memory for storing the measured lengths of the marks and the spaces and theoretical lengths of the marks and the spaces;

a deviation value calculator for calculating deviation values of the marks and the spaces from the varied write strategy based on the measured and theoretical lengths of the marks and the spaces stored in the memory;

a flexibility amount calculator for calculating amounts of intrinsic flexibility of the marks and the spaces using the calculated deviation values and probabilities of presence of the marks and the spaces;

a correction value calculator for calculating a correction value for the reference write strategy based on the calculated amounts of intrinsic flexibility and the probabilities of presence of the marks and the spaces, so that the deviation values of the marks and the spaces fall within a predetermined range;

a jitter value calculator for calculating a jitter value from the deviation values acquired from the calculated correction value, the measured jitter value before calculation of the correction value, and a number of samples when information is recorded using the write strategy; and a jitter calculation determiner for determining whether to calculate the jitter value based on a ratio of average values of the amounts of intrinsic flexibility and a standard deviation of the intrinsic flexibility, and a predetermined reference value.

6. The device of claim 5, wherein the average values of the amounts of intrinsic flexibility comprise average values of amounts of extension and contraction of the marks and the spaces.

7. A computer readable medium storing a program, executable by a computer, for recording or reproducing information on or from an optical information recording medium, the computer readable medium comprising:

a length measuring code segment for measuring lengths of marks and spaces recorded on the optical information recording medium using a reference write strategy or a varied write strategy, in which at least one set parameter is varied with respect to the reference write strategy;

a storing code segment for causing the measured lengths of the marks and the spaces to be stored in a measured value memory and theoretical lengths of the marks and the spaces to be stored in a theoretical length memory;

a jitter measuring code segment for measuring a jitter value of a reproduction signal;

a deviation code segment for calculating deviation values of the marks and the spaces from the varied write strategy, based on the lengths of the marks and the spaces stored in the measured value memory and the theoretical lengths of the marks and the spaces stored in the theoretical length memory;

a flexibility code segment for calculating amounts of intrinsic flexibility of the marks and the spaces using the calculated deviation values and probabilities of presence of the marks and the spaces;

a correction code segment for calculating a correction value for the reference write strategy based on the calculated amounts of intrinsic flexibility and the probabilities of presence of the marks and the spaces, so that the deviation values of the marks and the spaces fall within a predetermined range; and jitter calculating code segment for calculating a jitter value based on the deviation values acquired from the calculated correction value, the measured jitter value, and a number of samples when information is recorded using the write strategy.

8. The computer readable medium of claim 7, further comprising:

a write power code segment for determining whether write power is optimal based on the amounts of flexibility calculated by the flexibility code segment and a predetermined reference value.

9. The computer readable medium of claim 8, wherein the write power code segment determines the optimal write power based on sums of amounts of extension and contraction of the marks and the spaces calculated by the flexibility code segment.

10. The computer readable medium of claim 7, further comprising:

a jitter calculation determining code segment for determining whether to calculate the jitter value based on a ratio of average values of the amounts of intrinsic flexibility and a standard deviation of the intrinsic flexibility, and a predetermined reference value.

11. The computer readable medium of claim 10, wherein the average values of the amounts of intrinsic flexibility comprise average values of amounts of extension and contraction of the marks and the spaces.

\* \* \* \* \*